United States Patent
Song et al.

(10) Patent No.: US 11,411,283 B2
(45) Date of Patent: Aug. 9, 2022

(54) SEPARATOR HAVING COATING LAYER INCLUDING PARTIALLY REDUCED GRAPHENE OXIDE AND LITHIUM ION CONDUCTIVE POLYMER AND LITHIUM SECONDARY BATTERY COMPRISING THE SAME

(71) Applicant: LG CHEM, LTD., Seoul (KR)

(72) Inventors: Jieun Song, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 278 days.

(21) Appl. No.: 16/753,217

(22) PCT Filed: Oct. 8, 2018

(86) PCT No.: PCT/KR2018/011838
§ 371 (c)(1),
(2) Date: Apr. 2, 2020

(87) PCT Pub. No.: WO2019/083193
PCT Pub. Date: May 2, 2019

(65) Prior Publication Data
US 2020/0328391 A1    Oct. 15, 2020

(30) Foreign Application Priority Data

Oct. 26, 2017 (KR) .................. 10-2017-0139969

(51) Int. Cl.
*H01M 50/446* (2021.01)
*H01M 10/0525* (2010.01)
*H01M 4/02* (2006.01)

(52) U.S. Cl.
CPC ..... *H01M 50/446* (2021.01); *H01M 10/0525* (2013.01); *H01M 2004/028* (2013.01)

(58) Field of Classification Search
CPC .......... H01M 50/446; H01M 10/0525; H01M 2004/028

(Continued)

(56) References Cited

U.S. PATENT DOCUMENTS

| 2015/0318532 A1 | 11/2015 | Manthiram et al. |
| 2016/0036035 A1* | 2/2016 | Hayner ................. H01M 4/131 252/502 |

(Continued)

FOREIGN PATENT DOCUMENTS

| CN | 103950239 A | 7/2014 |
| CN | 104064707 A | 9/2014 |

(Continued)

OTHER PUBLICATIONS

Celgard, Celgard® High Performance Battery Separators, 2009, Celgard (Year: 2009).*

(Continued)

*Primary Examiner* — Sean P Cullen
(74) *Attorney, Agent, or Firm* — Birch, Stewart, Kolasch & Birch, LLP

(57) ABSTRACT

A separator in which at least one side of a porous substrate has thereon a coating layer containing a partially reduced graphene oxide with a sheet shape and a lithium ion conductivity polymer, which can solve the problem caused by the lithium polysulfide which occurs in the conventional lithium secondary battery, and a lithium secondary battery.

19 Claims, 5 Drawing Sheets

(58) Field of Classification Search
USPC .................................. 429/144, 251, 254
See application file for complete search history.

(56) References Cited

U.S. PATENT DOCUMENTS

| | | |
|---|---|---|
| 2016/0067654 A1 | 3/2016 | Zhang et al. |
| 2016/0336625 A1 | 11/2016 | Jeong et al. |
| 2017/0005307 A1 | 1/2017 | Kuratani et al. |
| 2017/0014778 A1 | 1/2017 | Park et al. |
| 2017/0093001 A1* | 3/2017 | Kim ............... B01D 69/148 |
| 2017/0106626 A1 | 4/2017 | Miyazono et al. |
| 2018/0269453 A1 | 9/2018 | Cho et al. |

FOREIGN PATENT DOCUMENTS

| | | |
|---|---|---|
| CN | 105870605 A | 9/2016 |
| CN | 106129314 A | 11/2016 |
| CN | 106129455 A | 11/2016 |
| CN | 106356488 A | 1/2017 |
| CN | 106463674 A | 2/2017 |
| CN | 107068945 A | 8/2017 |
| CN | 107275551 A | 10/2017 |
| EP | 3 667 768 A1 | 6/2020 |
| JP | 2016-7815 A | 1/2016 |
| JP | 2016-219411 A | 12/2016 |
| KR | 10-2015-0026092 A | 3/2015 |
| KR | 10-2015-0105022 A | 9/2015 |
| KR | 10-2016-0077529 A | 7/2016 |
| KR | 10-1678817 B1 | 11/2016 |
| KR | 10-2017-0003604 A | 1/2017 |
| KR | 10-2017-0058056 A | 5/2017 |
| WO | WO 2015/088451 A1 | 6/2015 |
| WO | WO 2015/115513 A1 | 8/2015 |
| WO | WO 2015/190432 A1 | 12/2015 |

OTHER PUBLICATIONS

Extended European Search Report for European Application No. 18870316.9, dated Oct. 26, 2020.
Jiang et al., "Inhibiting the shuttle effect of Li-S battery with a graphene oxide coating separator: Performance improvement and mechanism study," Journal of Power Sources, vol. 342, 2017, pp. 929-938, 10 pages total.
Xu et al., "Progress to composite separators for lithium sulfur batteries", Energy Storage Science and Technology, vol. 6, No. 3, 2017, pp. 433-450, with an English abstract.
International Search Report (PCT/ISA/210) issued in PCT/KR2018/011838, dated Jan. 17, 2019.
Singh, et al., "3-D vertically aligned few layer graphene—partially reduced graphene oxide/sulfur electrodes for high performance lithium-sulfur batteries", Sustainable Energy & Fuels, 2017, vol. 1, No. 7, pp. 1516-1523, Total 27 pages.
Lin et al., "Enhanced Performance of Lithium Sulfur Battery with a Reduced Graphene Oxide Coating Separator," Journal of the Electrochemical Society, vol. 162, No. 8, 2015 (Published May 29, 2015), pp. A1624-A1629 (total 7 pages).
Nishi, "Lithium Ion Secondary Batteries with Gelled Polymer Electrolytes.", Kobunshi, vol. 54, No. 12, Dec. 1, 2005, pp. 870-873 (total 5 pages), with an English abstract.

* cited by examiner

SEPARATOR HAVING COATING LAYER INCLUDING PARTIALLY REDUCED GRAPHENE OXIDE AND LITHIUM ION CONDUCTIVE POLYMER AND LITHIUM SECONDARY BATTERY COMPRISING THE SAME

TECHNICAL FIELD

The present application claims the benefit of Korean Patent Application No. 10-2017-0139969 filed on Oct. 26, 2017, all the contents of which are incorporated herein by reference.

The present invention relates to a separator capable of solving the problem caused by lithium polysulfide and a lithium secondary battery comprising the same.

BACKGROUND ART

Recently, as the miniaturization and weight reduction of electronic products, electronic devices, communication devices, and the like are rapidly progressing and the need for electric vehicles has been greatly increased in relation to environmental problems, there is also a growing demand for performance improvements in secondary batteries used as power sources for these products. Among them, the lithium secondary battery has been attracting considerable attention as a high-performance battery due to its high energy density and high standard electrode potential.

In particular, lithium-sulfur (Li—S) battery is a secondary battery using a sulfur-based material having an S—S bond (sulfur-sulfur bond) as a positive electrode active material and using lithium metal as a negative electrode active material. There is an advantage that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—$MnO_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode (anode) and a reduction reaction of sulfur occurs at the positive electrode (cathode). In the case of the lithium-sulfur battery, lithium polysulfide ($Li_2S_x$, x=2~8) is generated during the discharging and is dissolved in the electrolyte and is diffused into the negative electrode to not only cause various side reactions but also reduce the capacity of the sulfur participating in the electrochemical reaction. Also, during the charging process, the lithium polysulfide causes a shuttle reaction, thereby significantly lowering the charging/discharging efficiency.

In order to solve the above problems, a method of adding an additive having a property of adsorbing sulfur has been proposed, but this method has caused a deterioration problem and thus newly generated an additional side reaction of the battery. Therefore, in order to delay leak of the positive electrode active material, i.e., sulfur, a method of adding metal chalcogenide, alumina or the like or coating the surface with oxycarbonate or the like has been proposed. However, in the case of these methods, not only the sulfur is lost during processing or the method is complicated, but also the amount of the active material, i.e., sulfur, that can be put in (i.e., the amount of loading) is limited.

Therefore, for the commercialization of lithium-sulfur battery, the problem of lithium polysulfide is the first problem to be solved.

PRIOR ART DOCUMENT

Patent Document (Patent Document 1) Chinese Patent No. 106356488 (Jan. 25, 2017), "Composite separator for lithium ion battery or lithium sulfur battery and preparation method and application thereof", (Patent Document 2) Korean Patent No. 10-1678817 (Nov. 17, 2016), "Manufacturing method of reduced graphene oxide, reduced graphene oxide, manufacturing method of barrier film using the reduced graphene oxide and barrier film".

DISCLOSURE

Technical Problem

Therefore, the inventors of the present invention have confirmed that as a result of applying a new structure formed from a partially reduced graphene oxide having sheet shape with certain particle size and a lithium ion conductivity polymer to the separator, which is adjacent to a positive electrode, in order to solve the problems of lithium polysulfide on the positive electrode side of the lithium secondary battery, the battery performance of lithium. secondary battery is improved by solving the above problems, and thus completed the present invention.

Accordingly, it is an object of the present invention to provide a separator for a lithium secondary battery capable of solving the problem caused by lithium polysulfide.

Also, it is another object of the present invention to provide a lithium secondary battery comprising the above separator and thus having improved battery performance.

Technical Solution

In order to achieve the above objects, the present invention provides a separator for a lithium secondary battery comprising a porous substrate; and a coating layer formed on at least one side thereof wherein the coating layer comprises a partially reduced graphene oxide with a sheet shape and a lithium ion conductivity polymer.

At this time, the partially reduced graphene oxide comprises the first particles having a diameter of 20 to 30 μm and the second particles having a diameter of 1 to 5 μm.

At this time, the partially reduced graphene oxide is prepared by mixing the first particles and the second particles in a weight ratio of 1:1 to 10:1.

Also, the present invention provides a lithium secondary battery comprising the separator for the lithium secondary battery.

Advantageous Effects

The separator according to the present invention comprises a partially reduced graphene oxide with a sheet shape and a lithium ion conductivity polymer and thus solves the problem caused by the lithium polysulfide in the positive electrode of the lithium secondary battery.

In the case of the lithium secondary battery equipped with the above separator, the capacity of sulfur is not reduced, so that a high capacity battery can be realized and sulfur can be stably applied with high loading, and also there is no short-circuit or heat generation problem of the battery, so that the stability of the battery is improved. In addition, the lithium secondary battery has an advantage that the charging/discharging efficiency of the battery is high and the life characteristics are improved.

BEST MODE

Hereinafter, the present invention will be described in detail with reference to the accompanying drawings so that those skilled in the art can easily carry out the present invention. However, the present invention can be embodied in various different forms, and is not limited thereto.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

The lithium secondary battery is manufactured by using a material capable of intercalating/deintercalating lithium ions as a negative electrode and a positive electrode, and filling an organic electrolyte solution or a polymer electrolyte solution between a negative electrode and a positive electrode, and means an electrochemical device that generates electrical energy by the oxidation/reduction reaction when lithium ions are intercalated and deintercalated at positive and negative electrodes. According to an embodiment of the present invention, the lithium secondary battery may be a lithium-sulfur battery comprising a sulfur compound as an electrode active material of a positive electrode.

The present invention discloses a lithium secondary battery and a separator used therein.

Figure 1:
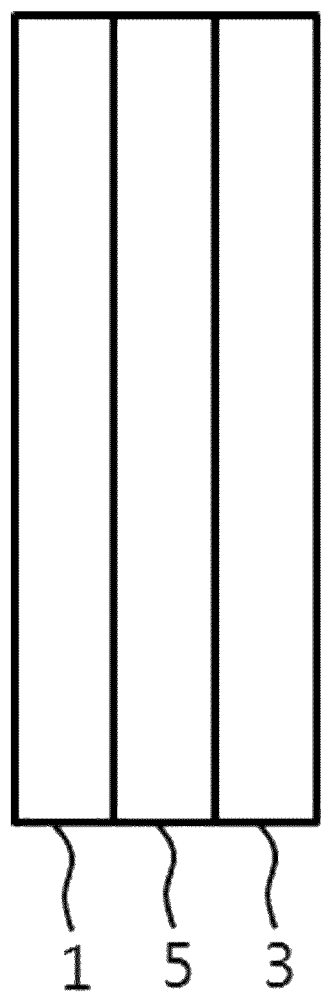
FIG. 1 is a cross-sectional view illustrating the lithium secondary battery according to an embodiment of the present invention.
Figure 2:
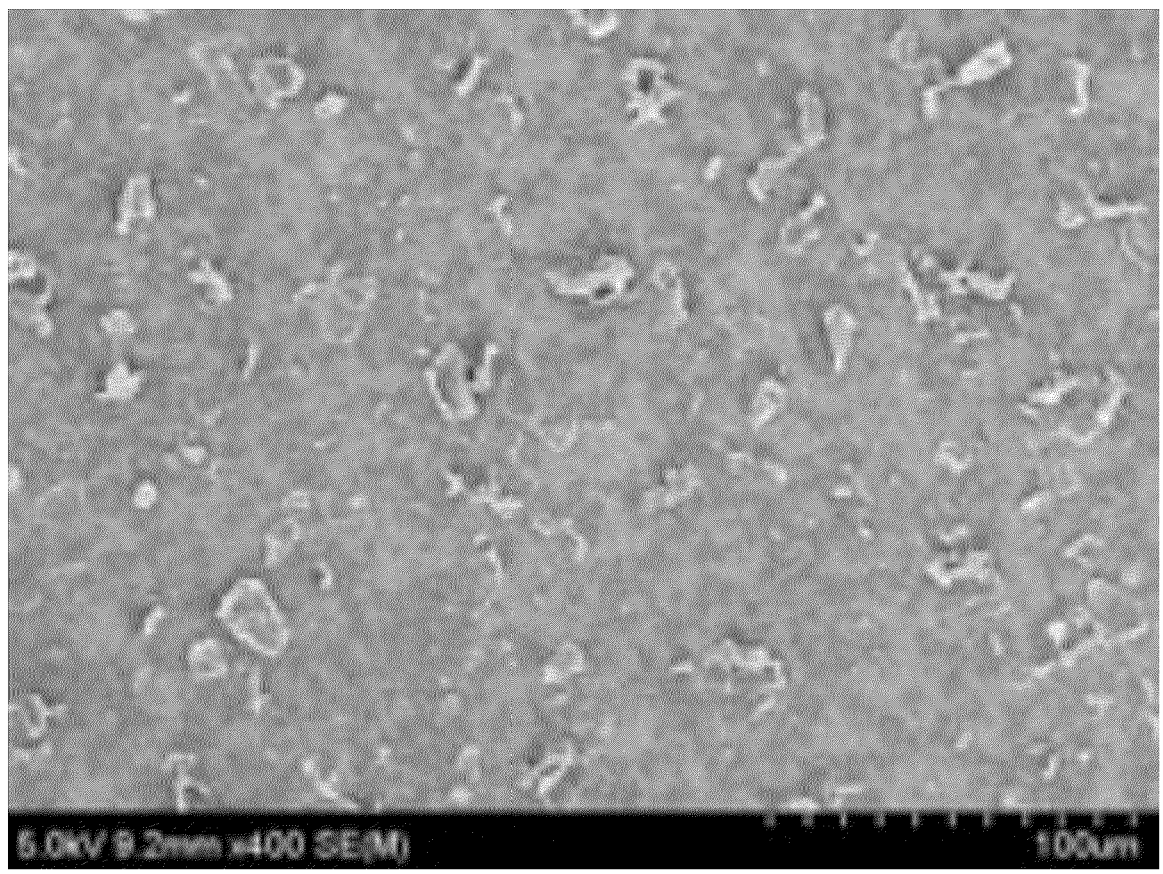
FIG. 2 is a scanning electron microscope (SEM) image of the separator according to Example 1.

FIG. 1 is a cross-sectional view showing a lithium secondary battery 10, and the battery has a structure in which lithium metal is comprised as negative electrode 1, sulfur is comprised as positive electrode 3, and separator 5 is disposed therebetween. At this time, an electrolyte (not shown) exists in a form in which a separator 5 is impregnated between the negative electrode 1 and the positive electrode 3.

During the charging/discharging of the lithium secondary battery 10, in the positive electrode, lithium polysulfide is produced and thus the charging capacity of the battery (10) is decreased and the energy is decreased, and in the negative electrode, lithium dendrite is generated and thus stability problems such as short-circuiting, heating, ignition and explosion of the battery are occurred along with reduction of the life of the battery. In order to solve these problems, a method of adding a new component on the electrode or forming an additional coating layer has been proposed, but the performance improvement effect of the battery to a desired level cannot be secured.

In order to solve such problems, a separator 5 having a new structure is proposed in the present invention.

Specifically, the separator 5 according to the present invention has a porous substrate and a coating layer formed on one side or both sides thereof. When the coating layer is formed on one side of the porous substrate, the coating layer may be located toward either the negative electrode or the positive electrode, and in the present invention, the coating layer may be formed so as to face the positive electrode 3.

The porous substrate constituting the separator 5 enables the transport of lithium ions between the negative electrode 1 and the positive electrode 3 while isolating or insulating the negative electrode 1 and the positive electrode 3 from each other. The separator 5 may be made of a porous, nonconductive or insulating material. The separator 5 may be an independent member such as a film.

Specifically, the porous substrate may be composed of a porous polymer film alone or may be composed by laminating porous polymer films, or may be, but is not limited to, conventional porous non-woven, for example, non-woven composed of glass fibers, polyethyleneterephthalate fibers having high melting point, and the like.

The material of the porous substrate is not limited in the present invention but may be a material commonly used in this field. The porous substrate may be typically formed from any one selected from the group consisting of polyolefin such as polyethylene and polypropylene, polyester such as polyethyleneterephthalate and polybutyleneterephthalate, polyamide such as aramid, polyacetal, polycarbonate, polyimide, polyetherketone, polyethersulfone, polyphenyleneoxide, polyphenylenesulfide, polyethylenenaphthalene, polytetrafluoroethylene, polyvinylidene fluoride, polyvinyl chloride, polyacrylonitrile, cellulose, nylon, polyparaphenylene benzobisoxazole, and polyarylate, or a mixture of two or more thereof.

The porous substrate may have a thickness of 3 μm to 100 μm, or 3 μm to 30 μm. Although the range of the porous substrate is not particularly limited to the above-mentioned range, if the thickness is excessively thinner than the lower limit described above, the separator 5 may be easily damaged during the use of the battery because mechanical properties are degraded. On the other hand, the pore size and porosity present in the porous substrate are also not particularly limited, but may be 0.01 μm to 10 μm and 25% to 85%, respectively.

The coating layer formed on at least one side of the porous substrate plays a role in solving the problem caused by the lithium polysulfide. To this end, the partially reduced graphene oxide with a sheet shape and the lithium ion conductivity polymer are comprised at the same time.

Graphene oxide is an oxide form of graphene and is a kind of carbon material in which a variety of oxygen-containing functional groups, such as epoxy, hydroxyl, lactone, lactol, ketone, ester, and carboxylic acid group are arranged irregularly in the two-dimensional carbon grid framework of the grapheme. The graphene itself has high electrical conductivity, and because of this property, it is difficult to apply it to the separator 5 which should impregnate the electrolyte solution and deliver lithium ions. The graphene oxide has the characteristics of an insulator and has a very high electrical resistance, while lithium ions can easily migrate between the stacked graphene oxides.

This graphene oxide shows, when heated above a certain temperature, a property of decomposing into 'reduced graphene oxide' (hereinafter, referred to as rGO) which is carbon material close to graphene, while voluntarily releasing gases such as CO, $H_2O$, and $CO_2$.

Particularly, in the present invention, 'partially reduced graphene oxide' produced by heating the graphene oxide at 350 to 450° C. is applied to the coating layer of the separator 5, that is, the partially reduced graphene oxide with a platelet sheet shape is applied, and thus lithium polysulfides generated by the reaction of sulfur from positive electrode 3 and lithium from negative electrode 1 are adsorbed, and thus the side reaction at the surface of the negative electrode 1 caused by their shuttle effect, for example, problems of formation at the interface of a high resistance layer of sulfide-based SEI layer generated by reaction with lithium metal or precipitation thereof at the electrode interface are solved, thereby improving the Coulomb efficiency and cycle stability of the battery.

In addition, the lithium polysulfide is constrained to the coating layer of the separator 5, and thus the migration of the lithium polysulfide through diffusion to the negative electrode 1 is inhibited and the problem of capacity loss of sulfur caused by lithium polysulfide in the prior art is solved, and as a result, it is possible to realize a high capacity battery and to realize safety even with high loading of sulfur. In addition, as the lithium polysulfide is constrained, the breakaway of the positive electrode 3 from the electrochemical reaction zone is minimized.

The partially reduced graphene oxide used in the present invention are slightly different from each other depending on the preparation method, but have a functional group containing oxygen on the surface or inside and various types of defects. Also, the partially reduced graphene oxide contains a hydroxyl group mainly on the surface and inside according to the production method, and further contains functional groups such as a carboxyl group, a carbonyl group, an epoxy group, an ester group, an ether group, an amide group or an amino group, etc. The graphene oxide is hydrophilic due to the functional groups and thus can be dispersed in an aqueous solution or a hydrophilic solvent, and additionally delaminated by applying ultrasonic waves thereto to form a sheet or flake shape having very thin thickness.

Specifically, the partially reduced graphene oxide of sheet shape according to the present invention has a thickness of 0.1 nm to 1 μm, preferably 0.5 to 100 nm, more preferably 1 to 50 nm, and a particle diameter of 0.1 to 100 μm, preferably 1 to 30 μm. They can be adjusted to meet the purpose of the coating. Due to the thickness of several nanometers of the graphene oxide, even when several layers of the graphene oxide are laminated, there is still an advantage in maintaining the nano level thickness. Due to this thin nano level thickness, the oxidized graphene has a flexible nature, is easily laminated on a porous substrate, and has good adhesion to the separator 5 due to its hydrophilic nature and thus is not easily separated during coating or during operation.

According to an embodiment of the present invention, the partially reduced graphene oxide with a sheet shape may comprise the first particles having a diameter of 20 to 30 μm and the second particles having a diameter of 1 to 5 μm.

Figure 3:
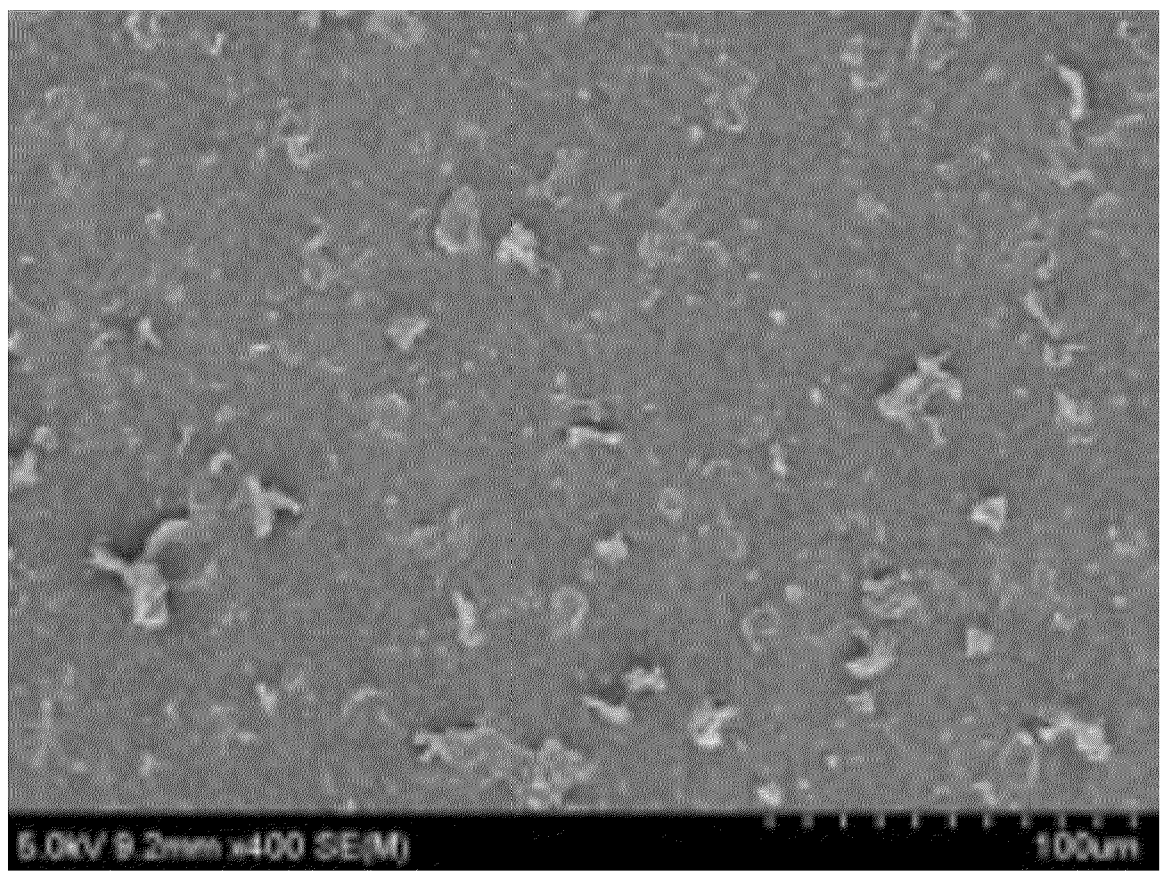
FIG. 3 is a scanning electron microscope (SEM) image of the separator according to Example 2.
Figure 4:
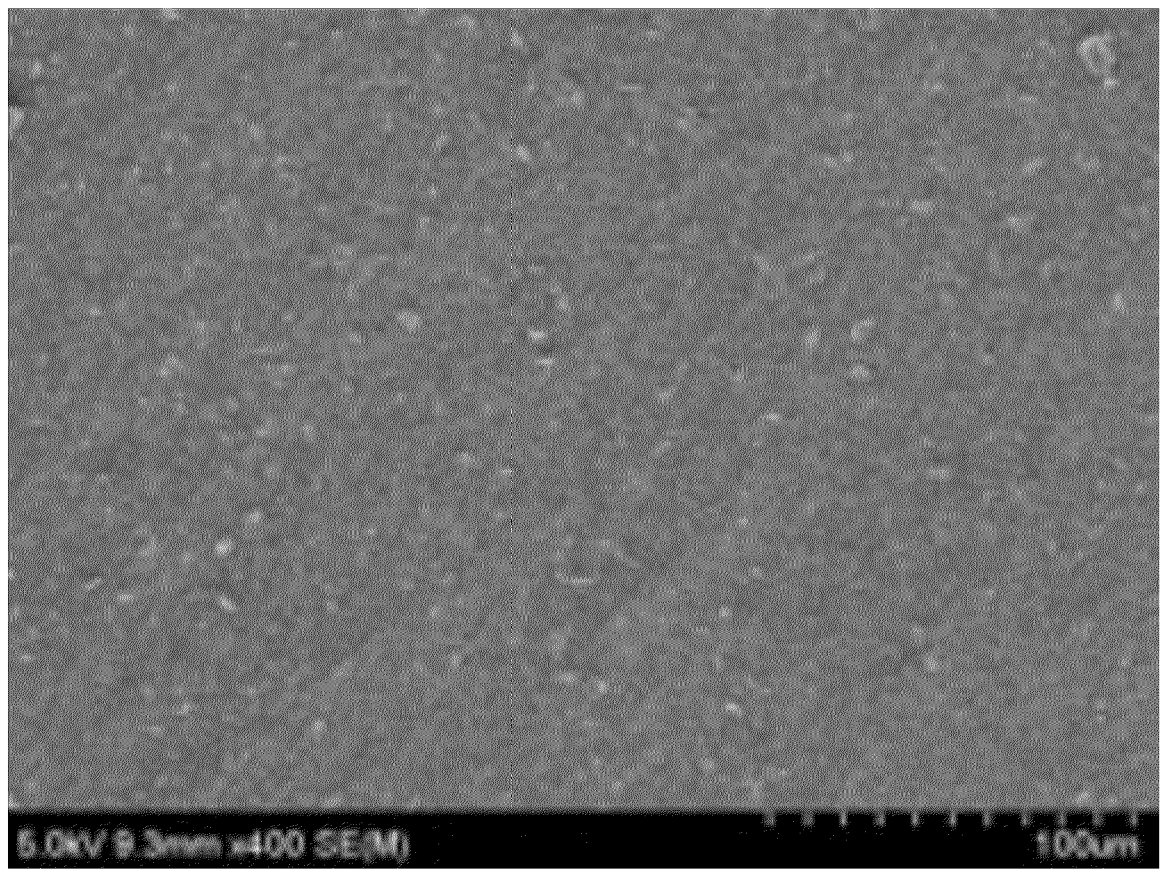
FIG. 4 is a scanning electron microscope (SEM) image of the separator according to Example 3.

According to another embodiment of the present invention, the partially reduced graphene oxide may be a mixture of the first particles and the second particles in a weight ratio of 1:1 to 10:1. Referring to FIG. 3, it can be confirmed that the second particles having a smaller particle size are placed between the first particles having a relatively larger particle size to fill the void space of the coating layer. Therefore, the lithium polysulfides generated from the lithium secondary battery can be more effectively adsorbed, thereby improving the initial charging/discharging capacity and life characteristics of the battery.

Also, the partially reduced graphene oxide according to an embodiment of the present invention may contain 1 to 30%, preferably 2 to 20%, most preferably 3 to 17% of oxygen atoms relative to the total amount of the graphene oxide through the heat treatment.

If the content of the oxygen atom is less than the above range, graphene oxide is excessively reduced and has the same properties as unoxidized graphene, which may lower the adsorption capacity to lithium polysulfide. If the content of the oxygen atom exceeds the above range, when applied it to the separator of the lithium secondary battery, the performance improvement of the battery with the high loading electrode is insignificant. Therefore, the content of the oxygen atom is suitably adjusted within the above range.

Although the grapheme oxide having the above effect solves the problem caused by the lithium polysulfide, when applied it to an actual separator 5, there was a new problem that the delivery rate of lithium ions is lowered due to the nature of the plate structure of grapheme oxide.

That is, if graphene oxide having a nano-level thickness is laminated on the separator 5 alone, since graphene oxide is deposited at a high level and graphene oxide does not form channels sufficient to transport lithium ions, the transfer of lithium ions is not easy. In other words, if a liquid electrolyte is used, the separator 5 must be present in a form sufficiently impregnated (wetted) by said liquid electrolyte so that lithium ions pass through the separator 5 and are transported to the positive electrode 3 and the negative electrode 1. Since the lithium ions are difficult to pass perpendicularly to the longitudinal direction of the graphene oxide, the lithium ions are transported through the lithium ion diffusion path between the stacked graphene oxides. At this time, if the plate-shaped graphene oxide is stacked at a high density, there arise problems that since it is not easy to secure the path or the lithium ions move horizontally with respect to the longitudinal direction and then are transported through the path, or so forth, the transport path of lithium ions becomes longer than necessary and the lithium ion delivery rate is lowered. The lowered transfer rate of lithium ions leads to low lithium ion conductivity and increases the internal impedance of the battery, and as a result, there arises a problem that the performance of the battery (i.e., specific capacity) is lowered.

Therefore, in the present invention, in order to solve the problem caused by the use of partially reduced graphene oxide alone, lithium ion conductivity polymer is used together.

In order to mix with graphene oxide, it is necessary to select a material that can easily secure the diffusion path of lithium ions and at the same time, increase the lithium ion conductivity, without affecting the adsorption of the lithium polysulfide, which is obtained by the graphene oxide.

The lithium ion conductivity polymer according to an embodiment of the present invention may comprise at least one selected from the group consisting of polyurethane, lithiated NAFION™, polyethylene oxide, polypropylene oxide, polysiloxane, polystyrene and polyethylene glycol. Among them, lithiated NAFION™ may be preferably used in the present invention.

The lithiated nafion polymer according to an embodiment of the present invention is a polymer formed by incorporating lithium ion to NAFION™ (trade name, Du Pont) which is a copolymer of sulfonated tetrafluoroethylene-based fluoropolymer, and means a form containing a Li⁺ ion instead of the proton of the sulfonic acid group in the following chemical structure.

[Formula 1]

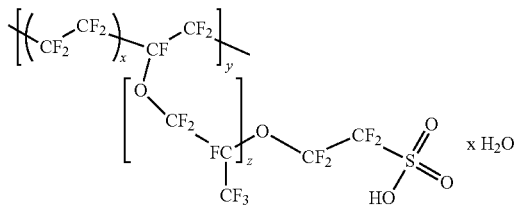

By mixing the partially reduced graphene oxide and the lithium ion conductivity polymer together, the lithium ion transfer path can be easily secured and the lithium ion transfer can be easily performed therethrough, thereby solving the problems caused by using the conventional graphene oxide alone.

In addition, since the partially reduced graphene oxide and the lithium ion conductivity polymer used as the materials of the coating layer according to the present invention are hydrophilic and the partially reduced graphene oxide of the present invention exhibits a porous form through thermal expansion in the heat treatment process, when a hydrophilic solvent is used as an electrolyte solution, they have high wettability thereto, thereby effectively transferring the lithium ions to the side of the lithium metal layer. Therefore, the lithium ions can be uniformly delivered to the negative electrode. As a result, the transfer of the lithium ions is effectively performed, and excellent battery characteristics are achieved without short circuit of the battery, and excellent charging/discharging characteristics are obtained without increasing resistance even in the case of forming a coating layer.

In order to sufficiently ensure the above effects, the content ratio of partially reduced graphene oxide and lithium ion conductivity polymer and the thickness of the coating layer according to the present invention are limited.

Specifically, the coating layer comprises the partially reduced graphene oxide and the lithium ion conductivity polymer in a weight ratio of the partially reduced graphene oxide: the lithium ion conductivity polymer of 1:5 to 1:20, preferably 1:10 to 1:15. If the content of the partially reduced graphene oxide is small (or if the content of the lithium ion conductivity polymer is excessive), the problem caused by lithium polysulfide cannot be sufficiently solved. On the contrary, if the content of the lithium ion conductivity polymer is small (or if the content of the partially reduced graphene oxide is excessive), there is a problem that the permeation of the electrolyte solution is difficult.

In addition, the thickness of the coating layer has a range that does not increase the internal resistance of the battery while ensuring the above effects, and may be 50 nm to 20 µm, preferably 100 nm to 10 µm, more preferably 200 nm to 3 µm. If the thickness is less than the above range, it cannot perform its function as a coating layer. On the contrary, if the above range is exceeded, stable interfacial characteristics can be imparted, but the initial interfacial resistance is increased, and thus an increase in internal resistance may be caused when manufacturing the battery.

As described above, the coating layer can be formed on one side or both sides of the separator 5, and the coating layer can be formed to face the positive electrode 3 to enhance the adsorption effect of the lithium polysulfide.

A method of preparing the separator 5 proposed by the present invention is not particularly limited in the present invention, and a method known to a person skilled in the art or various modified methods thereof can be used.

As one method, the method is performed by preparing a coating solution containing partially reduced graphene oxide and lithium ion conductivity polymer in a solvent, coating the coating solution on at least one side of a porous substrate, and drying it.

Alternatively, the coating solution may be coated on a substrate and then dried to prepare a coating layer, and thereafter, the coating layer may be transferred onto a porous substrate or laminated therewith to prepare the separator 5.

The solvent may be any solvent capable of sufficiently dispersing the partially reduced graphene oxide and lithium ion conductivity polymer. As an example, the solvent may be a mixed solvent of water and alcohol, or a mixture of one or more organic solvents. In that case, the alcohol may be a lower alcohol having 1 to 6 carbon atoms, preferably methanol, ethanol, propanol, isopropanol or the like. Examples of the organic solvent may comprise polar solvents such as acetic acid, dimethyl formamide (DMF) and dimethyl sulfoxide (DMSO), etc., and nonpolar solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride and tetrahydrofuran (THF), etc. Preferably, water or a mixed solvent of water and a lower alcohol may be used.

The content of the solvent may be contained at a level of having such a concentration as to facilitate the coating, and the specific content varies depending on the coating method and apparatus. As an example, each of partially reduced graphene oxide and lithium ion conductivity polymer can be dispersed in solvents respectively, and then mixed to prepare a coating solution. In that case, the concentration of the final coating solution is adjusted to be in the range of 0.001 to 30% by weight (solid content), and then the coating is carried out.

According to an embodiment of the present invention, the partially reduced graphene oxide may be coated at a rate of 5 to 100 µg/cm², preferably 5 to 40 µg/cm², and most preferably 5 to 20 µg/cm².

If the coating amount of the partially reduced graphene oxide is less than the above range, the adsorption capacity for the lithium polysulfide may be lowered. If the coating amount of the partially reduced graphene oxide exceeds the above range, the lithium ion conductivity is lowered or it is difficult to permeate the electrolyte solution. Therefore, the coating amount of the partially reduced graphene oxide is appropriately selected within the above range.

When a method such as transfer is used, the substrate may be a removable substrate, that is, a glass substrate or a plastic substrate. In these cases, the plastic substrate is not particularly limited in the present invention, and the plastic substrate may be formed of polyarylate, polyethylene terephthalate, polybutyleneterephthalate, polysilane, polysiloxane, polysilazane, polyethylene, polycarbosilane, polyacrylate, poly(meth)acrylate, polymethylacrylate, polymethyl(meth)acrylate, polyethylacrylate, cyclic olefin copolymer, polymethyl(meth)acrylate, cyclic olefin polymer, polypropylene, polyimide, polystyrene, polyvinylchloride, polyacetal, polyether ether ketone, polyether sulfone, polytetrafluoroethylene, polyvinylidene fluoride, or perfluoroalkyl polymer, etc.

If necessary, ultrasonic waves can be applied to the coating solution prepared for coating to achieve uniform dispersion. When the step of pulverizing by ultrasonic waves is further comprised, the dispersibility of the partially reduced graphene oxide and the lithium ion conductivity polymer in the solution can be improved, and the coating layer having more uniform characteristics can be produced.

The coating in this step is not particularly limited, and any known wet coating method can be used. As an example, a method of uniformly dispersing using a doctor blade or the like, die casting, Comma coating, screen printing, vacuum filtration coating, and the like can be mentioned.

Then, a drying process for removing the solvent after coating is performed. The drying process is performed at a temperature and a time sufficient to sufficiently remove the solvent. The conditions may vary depending on the type of the solvent, and therefore, it is not specifically mentioned in the present invention. As an example, the drying can be carried out in a vacuum oven of 30 to 200° C., and the drying method may comprise drying methods such as warm-air drying, hot air drying, drying by low humidity air, or vacuum drying. The drying time is not particularly limited, but is usually in the range of 30 seconds to 24 hours.

The coating thickness of the coating layer to be finally coated can be controlled by adjusting the concentration of the coating solution according to the present invention, the number of times of coating or the like.

In addition, the coating layer according to the present invention further comprises a lithium salt to facilitate lithium ion transfer.

The lithium salt is not particularly limited in the present invention, and any lithium salt can be used as long as it can be used in known lithium secondary battery. Specifically, the lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane, lithium lower aliphatic carboxylate, tetraphenyl lithium borate or imide, etc. Preferably, LiTFSI (Lithium (bis(trifluoromethanesulfonyl)imide) represented by (CF$_3$SO$_2$)$_2$NLi and LiFSI (Lithium bis(fluorosulfonyl)imide) represented by (FSO$_2$)$_2$NLi can be used.

The lithium ion conductivity polymer and the lithium salt is preferably used in an amount of 10 wt. % or less based on 100 wt. % of the coating layer.

The separator 5 having the coating layer as described above can be suitably applied to the lithium secondary battery as shown in FIG. 1.

This lithium secondary battery solves the problem caused by the lithium polysulfide and thus improves problems of capacity reduction and life degradation of the lithium secondary battery, and not only enables the implementation of high capacity and high loading electrodes, but also improves the life characteristics, and can be applied as a lithium secondary battery with high stability due to no possibility of explosion and fire.

The positive electrode, negative electrode and electrolyte solution suggested in the lithium secondary battery will be described below.

The positive electrode has a form in which the positive electrode active material is laminated on the positive electrode current collector.

The positive electrode current collector is not particularly limited as long as it has high conductivity without causing chemical changes in the battery. For example, stainless steel, aluminum, nickel, titanium, sintered carbon; or aluminum or stainless steel surface-treated with carbon, nickel, titanium, silver or the like may be used as the positive electrode current collector.

Elemental sulfur (S$_8$), sulfur-based compounds or mixtures thereof may be comprised as a positive electrode active material, and they are applied in combination with a conductive material since the sulfur material alone does not have electrical conductivity. Specifically, the sulfur-based compound may be Li$_2$S$_n$(n≥1), an organic sulfur compound or a carbon-sulfur polymer ((C$_2$S$_x$)$_n$: x=2.5~50, n≥2), etc.

The conductive material is used to further improve the conductivity of the electrode active material. The conductive material is not particularly limited as long as it has electrical conductivity without causing chemical changes in the battery, and for example, graphite such as natural graphite or artificial graphite carbon blacks such as carbon black, acetylene black, Ketjen black, channel black, furnace black, lamp black, and thermal black; conductive fibers such as carbon fiber and metal fiber; carbon fluoride; metal powders such as aluminum and nickel powder conductive Whiskers such as zinc oxide and potassium titanate; conductive metal oxides such as titanium oxide; polyphenylene derivative can be sued.

The positive electrode may further comprise a binder for binding the positive electrode active material and the conductive material and for binding to the current collector. The binder may comprise a thermoplastic resin or a thermosetting resin. For example, polyethylene, polypropylene, polytetrafluoroethylene (PTEE), polyvinylidene fluoride (PVDF), styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, and ethylene-acrylic acid copolymer and the like can be used alone or in combination with each other, but are not limited thereto, and any binders that can be used in the art are all possible.

The positive electrode as described above can be prepared by a conventional method. Specifically, the positive electrode can be prepared by applying a composition for forming the layer of the positive electrode active material to the current collector, drying it, and optionally compressing and molding it into a current collector to improve electrode density, Wherein the composition is prepared by mixing the positive electrode active material, the conductive material and the binder in an organic solvent or water. In that case, as the organic solvent, it is preferable to use a solvent which can uniformly disperse a positive electrode active material, a binder and a conductive material, and which is easily evaporated. Specifically, acetonitrile, methanol, ethanol, tetrahydrofuran, isopropyl alcohol, and the like can be used as the organic solvent.

The negative electrode has a form in which the negative electrode active material is laminated on the negative electrode current collector. If necessary, the negative electrode current collector can be omitted.

In that case, the negative electrode current collector is not particularly limited as long as it has electrical conductivity without causing chemical changes in the battery. For example, copper, stainless steel, aluminum, nickel, titanium, sintered carbon; copper or stainless steel surface-treated with carbon, nickel, titanium, silver or the like; aluminum-cadmium alloy or the like may be used as the negative electrode current collector. In addition, the shape of the negative electrode current collector can be various forms such as a film having or not having fine irregularities on a surface, sheet, foil, net, porous body, foam, nonwoven fabric and the like.

The lithium metal layer may be lithium metal or lithium alloy. In that case, the lithium alloy contains an element capable of alloying with lithium, wherein the element may be Si, Sn, C, Pt, Ir, Ni, Cu, Ti, Na, K, Rb, Cs, Fr, Be, Mg, Ca, Sr, Sb, Pb, In, Zn, Ba, Ra, Ge, Al, Co and alloys thereof.

The lithium metal layer may be a sheet or a foil. In some cases, the lithium metal layer may have a form in which lithium metal or lithium alloy is deposited or coated by a dry process on the current collector, or a form in which metal and alloy in the form of a particle phase are deposited or coated by a wet process or the like.

The electrolyte solution of the lithium secondary battery is a lithium salt-containing electrolyte solution, which may be an aqueous or non-aqueous electrolyte solution, preferably a non-aqueous electrolyte composed of an electrolyte solution and a lithium salt in an organic solvent. Additionally, organic solid electrolytes, inorganic solid electrolytes, or the like may be comprised, but is not limited thereto.

The non-aqueous organic solvent may comprise, for example, aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydrofuran, 2-methyl tetrahydrofuran, dimethyl sulfoxide, 1,3-dioxolane, 4-methyl-1,3-dioxene, diethylether, formamide, dimethylformamide, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate and the like.

In that case, an ether-based solvent is used as the non-aqueous solvent, so as to be similar to the electrode of the present invention. Examples of the solvent comprise tetrahydrofuran, ethylene oxide, 1,3-dioxolane, 3,5-dimethyl isoxazole, 2,5-dimethyfuran, furan, 2-methylfuran, 1,4-oxane, 4-methyldioxolane and the like.

The lithium salt is a substance which is easily soluble in the non-aqueous electrolyte. The lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, lithium chloroborane, lithium lower aliphatic carboxylate, tetraphenyl lithium borate, or lithium imide, etc.

The shape of the lithium secondary battery 10 as described above is not particularly limited and may be, for example, a jelly-roll type, a stack type, a stack-folding type (comprising a stack-Z-folding type), or a lamination-stacking type, and preferably a stack-folding type.

An electrode assembly in which the positive electrode 3, the separator 5, and the negative electrode 1 are successively laminated is manufactured and then placed it in a battery case. Thereafter, a lithium secondary battery 10 is manufactured by injecting an electrolyte solution into the upper part of the case and sealing it with a cap plate and a gasket.

The lithium secondary battery 10 may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium secondary battery 10 according to the present invention is a high-capacity and high-loading battery and can be used as a power source for devices requiring such characteristics. Specific examples of the device may comprise, but are not limited to, a power tool that is powered by a battery powered motor; electric cars comprising an electric vehicle (EV), a hybrid electric vehicle (HEV), a plug-in hybrid electric vehicle (PHEV), and the like; an electric motorcycle comprising an electric bike (E-bike) and an electric scooter (Escooter); an electric golf cart; and a power storage system, Hereinafter, Examples, Comparative Examples and Experimental Examples are described to help understand the effects of the present invention. It should be noted, however, that the following description is only an example of the contents and effects of the present invention, and the scope and effect of the present invention are not limited thereto.

EXAMPLES

Example 1

(1) Manufacture of Separator

As a porous substrate, a polyethylene (50% of porosity) film having a thickness of 20 µm was prepared An aqueous dispersion (concentration of 0.002 wt. %) of the partially reduced graphene oxide (particle size of 25 µm, content of oxygen atoms in graphene of 15%) with a sheet shape heat-treated at 400° C. and an aqueous dispersion (concentration of 0.25 mg/mL) of lithiated NAFION™ (Du Pont) were mixed and then sonicated for 8 hours to prepare a coating solution (weight ratio of partially reduced graphene oxide: lithiated NAFION™=1:12.5).

The coating solution was poured onto the porous substrate and filtered under reduced pressure to form a coating layer of 10 µg/cm$^2$ on the surface of the porous substrate opposite to the positive electrode, and dried at for 24 hours to prepare a separator. At this time, the coating layer was measured to have a thickness of about 1.6±0.4 µm.

(2) Lithium Secondary Battery

The conductive carbon having electric conductivity and sulfur were mixed through a ball mill process in a weight ratio (wt. %) of conductive carbon:sulfur of 30:70 (21 g: 49 g) to obtain a sulfur-carbon composite. A slurry of positive electrode active material was prepared by using a composition composed of 70.0 g of positive electrode active material containing the composite, 20.0 g of Super-P as a conductive material, 10.0 g of polyvinylidene fluoride as a binder and 500 g of N-methyl-2-pyrrolidone as a solvent, based on the total weight of the slurry of the positive electrode active material, and then coated on an aluminum current collector to prepare a positive electrode active portion.

A lithium secondary battery was prepared using a lithium foil having a thickness of about 40 μm as a negative electrode, together with the positive electrode, using a mixed solution of dimethoxyethane:dioxolane (1:1 by volume) as an electrolyte solution, in which 1 M of LiN (CF$_3$SO$_2$)$_2$ was dissolved, and using the separator prepared above.

Example 2

A lithium secondary battery was manufactured in the same manner as in Example 1 above except that the partially reduced graphene oxides with a sheet shape having particle diameter of 25 μm and particle diameter of 3 μm were mixed at a weight ratio of 1:1.

Example 3

A lithium secondary battery was manufactured in the same manner as in Example 1 above except that the partially reduced graphene oxide with a sheet shape having particle diameter of 3 μm is used.

Comparative Example 1

A lithium secondary battery was manufactured in the same manner as in Example 1 above except that the coating layer is not formed, and the porous substrate is used as it is as a separator.

Experimental Example 1

The lithium secondary batteries manufactured in the above Examples and Comparative Example were driven under the conditions of 0.1C/0.1C (2.5 cycles), [0.2C/0.2C (3 cycles), 0.3C/0.5C (10 cycles) repeated] charging/discharging, the initial charging/discharging capacity was measured and the capacity change was confirmed by performing 160 cycles.

Figure 5:
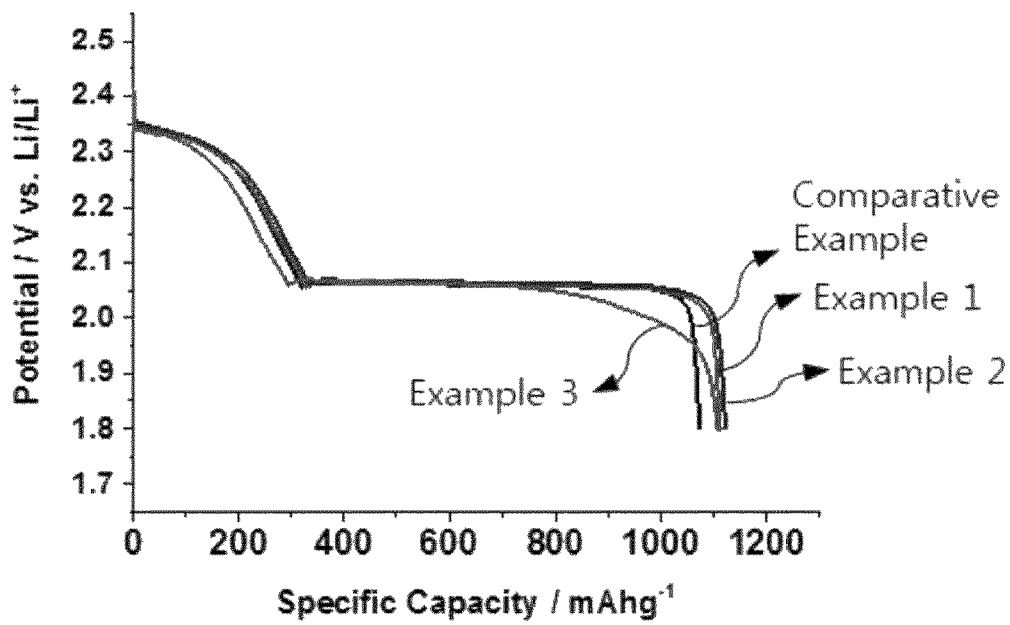
FIG. 5 is a graph showing the initial charging/discharging capacities of the lithium secondary batteries manufactured in Examples 1 to 3 and Comparative Example 1.

FIG. 5 is a graph showing the initial charging/discharging capacities of the lithium secondary batteries manufactured in Examples 1 to 3 and Comparative Example 1. Referring to FIG. 5, it can be seen that the battery of Example 2 having the coating layer formed by mixing the partially reduced graphene oxides having different particle sizes according to the present invention has a high initial discharge capacity, as compared to batteries of Comparative Example 1 without them and Examples 1 and 3 composed of only the first particle or the second particle.

Figure 6:
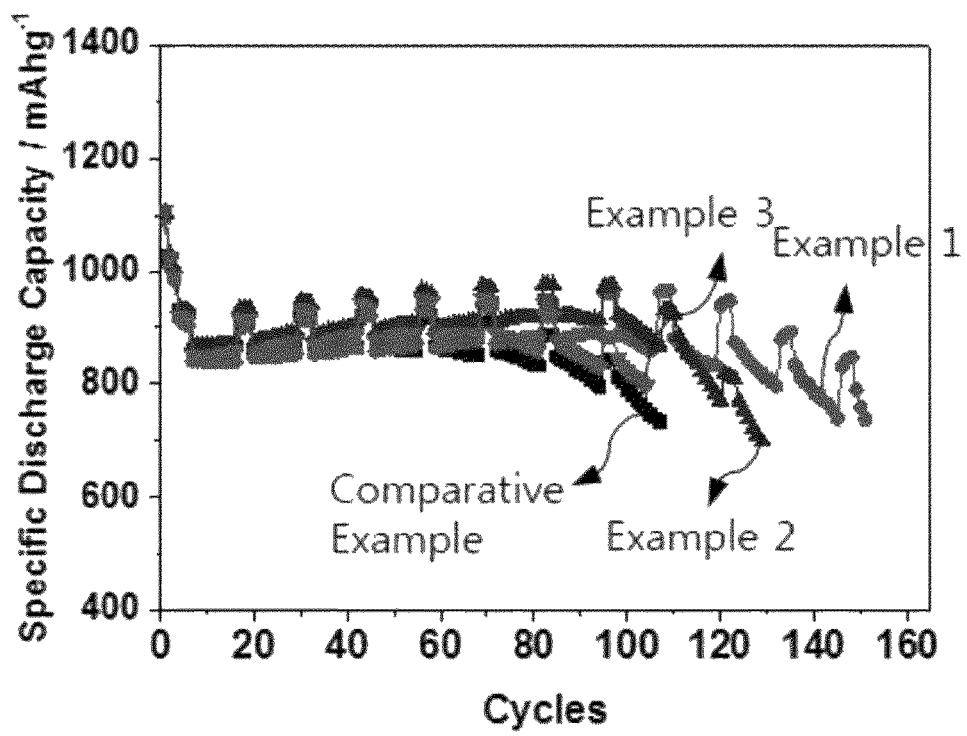
FIG. 6 is a graph showing life characteristics of a lithium secondary batteries manufactured in Examples 1 to 3 and Comparative Example 1.

FIG. 6 is a graph showing life characteristics of a lithium secondary batteries manufactured in Examples 1 to 3 and Comparative Example 1. Referring to FIG. 6, it can be seen that the battery of Example 2 shows a high capacity retention ratio relative to the initial charging/discharging and the capacity improvement effect and is superior to the batteries of Comparative Example 1 and Example 3 in life characteristics.

From these results, it can be seen that due to the coating layer proposed in the present invention, the high initial charging/discharging capacity characteristics and excellent life characteristics can be secured by adsorbing the lithium polysulfide when driving the lithium secondary battery.

[Description of Symbols]

| 10: Lithium secondary battery | 1: Negative electrode |
| 3: Positive electrode | 5: Separator |

The invention claimed is:

1. A separator for a lithium secondary battery comprising:
   a porous substrate; and
   a coating layer on at least one side of the porous substrate, wherein the coating layer comprises a partially reduced graphene oxide with a sheet shape and a lithium ion conductivity polymer,
   wherein the partially reduced graphene oxide comprises first particles having a diameter of 20 μm to 30 μm and second particles having a diameter of 1 μm to 5 μm.

2. The separator for the lithium secondary battery according to claim 1, wherein the porous substrate has a thickness of 3 μm to 100 μm and a pore size of 0.01 μm to 10 μm.

3. The separator for the lithium secondary battery according to claim 1, wherein the porous substrate comprises at least one material selected from the group consisting of polyethylene, polypropylene, polyethyleneterephthalate, polybutyleneterephthalate, polyamide, polyacetal, polycarbonate, polyimide, polyetherketone, polyethersulfone, polyphenyleneoxide, polyphenylenesulfide, polyethylenenaphthalene, polytetrafluoroethylene, polyvinylidene fluoride, polyvinyl chloride, polyacrylonitrile, cellulose, nylon, polyparaphenylene benzobisoxazole, and polyarylate.

4. The separator for the lithium secondary battery according to claim 1, wherein the lithium ion conductivity polymer comprises at least one selected from the group consisting of polyurethane, lithiated copolymer of sulfonated tetrafluoroethylene-based fluoropolymer, polyethylene oxide, polypropylene oxide, polysiloxane, polystyrene and polyethylene glycol.

5. The separator for the lithium secondary battery according to claim 1, wherein the partially reduced graphene oxide with the sheet shape has a thickness of 0.1 nm to 1 μm.

6. The separator for the lithium secondary battery according to claim 1, wherein the partially reduced graphene oxide comprises a mixture of the first particles and the second particles at a weight ratio of 1:1 to 10:1.

7. The separator for the lithium secondary battery according to claim 1, wherein the partially reduced graphene oxide comprises 1 to 30% of oxygen atoms relative to a total amount of the partially reduced graphene oxide.

8. The separator for the lithium secondary battery according to claim 1, wherein the partially reduced graphene oxide comprises 2 to 20% of oxygen atoms relative to a total amount of the partially reduced graphene oxide.

9. The separator for the lithium secondary battery according to claim 1, wherein the partially reduced graphene oxide comprises 3 to 17% of oxygen atoms relative to a total amount of the partially reduced graphene oxide.

10. The separator for the lithium secondary battery according to claim 1, wherein the partially reduced graphene oxide is present on the at least one side of the porous substrate in an amount of 5 to 100 μg/cm$^2$.

11. The separator for the lithium secondary battery according to claim 1, wherein the partially reduced graphene oxide is present on the at least one side of the porous substrate in an amount of 5 to 40 μg/cm$^2$.

12. The separator for the lithium secondary battery according to claim 1, wherein the partially reduced graphene oxide is present on the at least one side of the porous substrate in an amount of 5 to 20 μg/cm$^2$.

13. The separator for the lithium secondary battery according to claim 1, wherein the coating layer comprises a mixture of the partially reduced graphene oxide and the lithium ion conductivity polymer at a weight ratio of 1:5 to 1:20.

14. The separator for the lithium secondary battery according to claim 1, wherein the coating layer comprises a mixture of the partially reduced graphene oxide and the lithium ion conductivity polymer at a weight ratio of 1:10 to 1:15.

15. The separator for the lithium secondary battery according to claim 1, wherein the coating layer has a thickness of 50 nm to 20 μm.

16. The separator for the lithium secondary battery according to claim 1, wherein the coating layer has a thickness of 100 nm to 10 μm.

17. The separator for the lithium secondary battery according to claim 1, wherein the coating layer has a thickness of 200 nm to 3 μm.

18. A lithium secondary battery comprising the separator according to claim 1.

19. The lithium secondary battery according to claim 18, wherein the lithium secondary battery comprises a sulfur compound in a positive electrode.

* * * * *